(12) United States Patent
Kojic et al.

(10) Patent No.: US 7,231,892 B2
(45) Date of Patent: Jun. 19, 2007

(54) METHOD FOR EXTENDING HCCI LOAD RANGE USING A TWO-STROKE CYCLE AND VARIABLE VALVE ACTUATION

(75) Inventors: Aleksandar Kojic, Cupertino, CA (US); Jean-Pierr Hathout, San Jose, CA (US); Jasim Ahmed, Mountain View, CA (US)

(73) Assignee: Robert Bosch GmbH (DE)

( * ) Notice: Subject to any disclaimer, the term of this patent is extended or adjusted under 35 U.S.C. 154(b) by 51 days.

(21) Appl. No.: 10/454,095

(22) Filed: Jun. 3, 2003

(65) Prior Publication Data

US 2004/0244732 A1    Dec. 9, 2004

(51) Int. Cl.
*F02B 69/06* (2006.01)

(52) U.S. Cl. ........................................................ 123/21

(58) Field of Classification Search ................... 123/21, 123/90.11, DIG. 7
See application file for complete search history.

(56) References Cited

U.S. PATENT DOCUMENTS

| | | | |
|---|---|---|---|
| 4,671,226 A | 6/1987 | van Rinsum | |
| 4,907,544 A | 3/1990 | Burrahm | |
| 5,005,539 A * | 4/1991 | Kawamura | 123/21 |
| 5,007,382 A * | 4/1991 | Kawamura | 123/21 |
| 5,022,353 A * | 6/1991 | Kamamura | 123/21 |
| 5,036,801 A * | 8/1991 | Imajou | 123/21 |
| 5,222,993 A * | 6/1993 | Crane | 123/256 |
| 5,517,951 A | 5/1996 | Paul et al. | |
| 6,382,193 B1 * | 5/2002 | Boyer et al. | 123/560 |
| 2002/0073939 A1 | 6/2002 | Denger et al. | |

FOREIGN PATENT DOCUMENTS

| | | |
|---|---|---|
| DE | 28 47 527 | 5/1980 |
| DE | 199 51 093 | 4/2001 |
| DE | 100 04 528 | 8/2001 |
| DE | 100 53 336 | 7/2002 |
| EP | 0 397 359 | 11/1990 |
| EP | 0 433 039 | 6/1991 |
| EP | 1 234 960 | 8/2002 |
| WO | WO 00/28198 | 5/2000 |
| WO | WO 01/57378 | 8/2001 |

(Continued)

OTHER PUBLICATIONS

Kaahaaina, N.B., Simon, A.J., Caton, P.A., and Edwards, C.F., "Use of Dynamic Valving to Achieve Residual-Affected Combustion," SAE paper 2001-01-0549, 2001.

(Continued)

*Primary Examiner*—Stephen K. Cronin
*Assistant Examiner*—Jason Benton
(74) *Attorney, Agent, or Firm*—Kenyon & Kenyon LLP

(57) ABSTRACT

A method and system for extending the load range of Homogeneous Charge Compression Ignition (HCCI) in an internal combustion engine includes detecting a current state of the engine, detecting a load demand placed on the engine, determining if the load demand is beyond a power generating capacity of a four-stroke engine cycle based on the current state of the engine and the load demand, and switching from the four-stroke engine cycle mode to a two-stroke engine cycle mode when it is determined that the load demand is beyond the capacity of the four-stroke engine cycle.

13 Claims, 4 Drawing Sheets

FOREIGN PATENT DOCUMENTS

WO            WO 02/50409            6/2002

OTHER PUBLICATIONS

Onishi, S., Jo, S.H., Shoda, K., and Kato, S., "Active Thermo-Atmospheric Combustion (ATAC)—A New Combustion Process for Internal Combustion Engines," SAE paper 790501, 1979.

Najt, P.M., Foster, D.E., "Compression-Ignited Homogeneous Charge Combustion," SAE Paper 830264, 1983.

Law, D., Kemp, D., Allen, J., Kirkpatrick, G., Copland, T., "Controlled Combustion in an IC-Engine with a Fully Variable Valve Train," SAE Paper 2001-01-0251, 2001.

* cited by examiner

METHOD FOR EXTENDING HCCI LOAD RANGE USING A TWO-STROKE CYCLE AND VARIABLE VALVE ACTUATION

FIELD OF THE INVENTION

The present invention relates to internal combustion engines, and more particularly relates to a system and method for operating an internal combustion engine and extending the load range of a four-stroke Homogeneous Charge Compression Ignition (HCCI) using a two-stroke cycle enabled by variable valve actuation.

BACKGROUND INFORMATION

HCCI is a hybrid of two standard internal combustion processes: a spark-ignition (SI) process and a Diesel process. In an HCCI combustion process, typically the same fuel (gasoline) is used as in an SI process, but in contrast to standard SI, a spark plug is not used for ignition of the fuel. With respect to ignition, HCCI is more similar to a Diesel process in that the charge (fuel/air mixture) is compression ignited (i.e., auto-ignited).

Like Diesel fuel, gasoline is also auto-ignitable when heated to a sufficient high temperature. The typical auto-ignition temperature of gasoline is higher than for Diesel fuel, and is also higher than the typical temperature achieved in a cylinder at the end of the compression stroke in a typical four-stroke SI engine.

As discussed, for example, in the article "Use of Dynamic Valving to Achieve Residual-Affected Combustion", by N. B. Kaahaaina et al., published as SAE Technical Paper Series No. 2001-01-0529 (2001), the HCCI engine operates in a four-stroke cycle, like the SI engine. The auto-ignition of the gasoline/air mixture at the end of the compression stroke is achieved by providing an elevated starting temperature at the beginning of the stroke in the HCCI engine in comparison to the temperature used in an SI engine. This elevated starting temperature is primarily achieved by either or both of two processes: a pre-heating of the air/fuel charge, or a reintroduction of some of the hot exhaust gasses from the previous cycle into the current cycle. In terms of efficiency, the latter method is typically superior.

After auto-ignition and during the combustion process, the typical HCCI engine achieves a higher average temperature in the cylinder, but a lower peak temperature as compared to SI. Furthermore, combustion sites are distributed throughout the cylinder, and there is generally no coherent flame front in the cylinder as occurs in SI engines. These attributes of HCCI combustion combine to yield a higher efficiency and a dramatic decrease in the amounts of certain types of pollutants.

However, the HCCI method of combustion also introduces certain disadvantages. A primary disadvantage is that HCCI is generally more suitable to low and medium load regimes than for higher load regimes. This stems primarily from the fact that HCCI uses a diluted charge, and hence cannot achieve the high peak power attributes capable when more concentrated charges are applied.

Two-stroke HCCI engines have been used, but these engines have been restricted to small, low-power applications which are not suitable, due to the typical drawbacks of the purely two-stroke cycle, for use in commercial vehicles. A first significant disadvantage of using a purely two-stroke engine in a commercial vehicle is that lubrication of two-stroke engines is a difficult problem. Lubrication oil often needs to be mixed in with the gasoline fuel, and therefore partially combusts in the cylinder directly introducing a large number of pollutants. A second significant disadvantage of purely two-stroke engines is that during the exhaust/intake cycle, there is a period of time when both the intake and exhaust ports are open, which allows a portion of the uncombusted fuel/oil mixture to flow out into the environment.

However, in a two-stroke cycle, the work-producing cycle happens twice as fast in comparison to a four-stroke cycle.

Accordingly, it would be advantageous to provide a system and method that achieves the advantages of the standard HCCI process while overcoming the inherent disadvantages and shortcomings of both purely four-stroke and purely two-stroke HCCI engines.

SUMMARY OF THE INVENTION

The method of the present invention overcomes the load restrictions of the standard four-stroke HCCI engine by switching to a two-stroke cycle operation when high-load is required. In the two-stroke cycle, the work-producing cycle occurs twice as often as in the four-stroke cycle, and hence the power output of the engine can be increased. The switching between the two-stroke cycle and the four-stroke cycle is achieved by means of judiciously and suitably varying the timing and lift profile of both the intake and exhaust valves.

The system of the present invention employs fully variable and controllable valves, such as electro-hydraulic valves, whose timing and profile are completely decoupled from the piston position in the cylinder. Other types of fully variable valves that may be used in this context include electro-magnetic valves. The system also includes a turbocharged compressor.

According to the present invention, the inherent difficulties of using a two-stroke engine in commercial vehicle is addressed by an engine system in which the two-stroke cycle run is performed in an engine designed for a four-stroke cycle. Hence, lubrication issues are resolved. In this engine system, variable valves are used to ensure that no flow-through of fresh charge from the intake to exhaust ports occurs.

DETAILED DESCRIPTION

Figure 1:
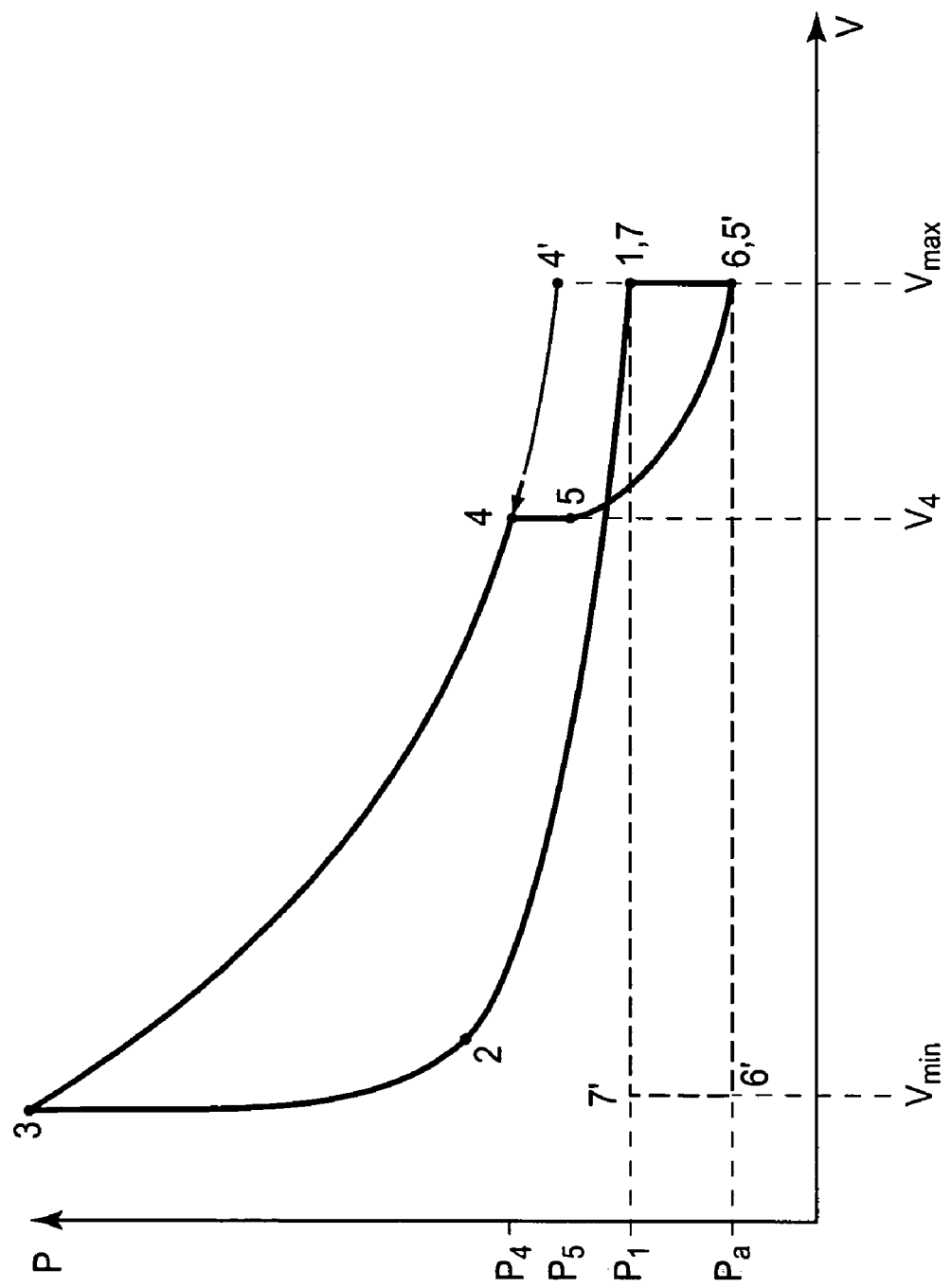
FIG. 1 shows a graph depicting both a turbocharged two stroke engine cycle (solid line) according to an embodiment of the present invention and a supercharged standard four-stroke engine cycle (dotted line) with pressure on the y-axis versus volume on the x-axis.

FIG. 1 depicts an ideal-case modified two-stroke HCCI engine cycle according to an embodiment of the present invention shown in a solid line and an ideal-case standard supercharged 4-stroke engine cycle shown in a dotted line.

Each cycle includes several paths between numbered points, where each point represents a given pressure/volume state in an engine cylinder and each path represents a distinct portion of the cycle in which the pressure/volume state of the cylinder changes. For example, the path from point 1 to point 2 represents a compression stroke, the path from point 2 to point 3 represents a combustion stroke, the path from point 3 to point 4 represents an expansion stroke in the modified HCCI process according to the present invention, while the path from 3 to point 4' represents an expansion stroke in a standard 4-stroke cycle. In the modified two-stroke HCCI process according to the present invention, the path from 4 to 6 includes an exhaust of gases between 4 and 5, and a continued expansion of the piston between 5 and 6, whereas in the standard 4-stroke engine, the path between points 4', 5', and 6' represents a exhaust stroke that brings the piston to the top of the cylinder, emptying the cylinder of exhaust gases. In the modified process, the path between 6 and 7 represents an intake of a charge, while in the standard 4-stroke, the path from point 6' to point 7' back to point 1 represents an intake stroke with an accompanying movement of the piston.

The detailed mechanism of the modified two-stroke HCCI process and the standard 4-stroke cycle will now be explained with reference to the various pressure/volume points on the graph of FIG. 1. In the modified two-stroke HCCI process, during the expansion stroke, the exhaust valve is opened at a higher pressure (and lower volume) at point 4 in comparison to the standard four-stroke cycle in which the exhaust valve opened at point 4'. Since the pressure at point 4 ($P_4$) in the cylinder is larger than the pressure within the exhaust manifold, a portion of the contents of the cylinder escape rapidly into the exhaust manifold, decreasing the pressure within the cylinder to $P_5$ (at point 5), at which point the exhaust valve is closed. It is noted that the precise location of points 4 and 5 on the graph are controllable and depend on the amount of the contents of the cylinder it is desired to retain in order to dilute the charge in the next cycle. After closing the exhaust valve, the remaining cylinder contents are then expanded to point 6, at which the intake valve is opened. The intake port is turbocharged to an elevated pressure $P_1$ so that the contents of a charge enter the cylinder between points 6 and 7. The elevated pressure $P_1$ at the intake manifold allows a fresh charge to be injected into the cylinder without requiring the suction normally occurring when the piston moves downward in an expansion stroke, thus dispensing of the need for both an exhaust stroke and an intake stroke. The intake valve is closed at point 7, and a new cycle begins with a new compression stroke. The pressure at point 1 is controllably selected so that a sufficient initial temperature $T_1$ is achieved to enable autoignition of the fuel at the beginning of combustion at point 2. In this manner the entire cycle according to the present invention uses two strokes of the piston instead of four.

By contrast, in the standard four-stroke cycle, the expansion stroke is carried further to a larger volume at $V_{4'}$, which is followed by a full stroke of the piston in the exhaust stroke in the path from 4' to 5' to 6'. Once the exhaust stroke is complete, the piston is brought down in a further stroke to create the suction for drawing in charge during an intake cycle from 7' to 1.

The amount of work performed by a cylinder piston in a cycle is defined as integral over the cycle of the quantity pdV, where p is the pressure and dV is the elemental change in volume of the cylinder. Graphically, the amount of work performed in a cycle corresponds to the area enclosed by the traces of the p-V curve where the orientation of the curve is clockwise (the area delimited by points 2-3-4-5), while the area enclosed by the p-V curve where the orientation of the curve is counter-clockwise represents the amount of work needed to be input externally to the cycle (the area delimited by points 5-6-1). Thus, it should be noted that the modified two-stroke HCCI process according to the present invention performs an amount of work $W_{2s}$, which is less than the amount of work produced by the supercharged four-stroke cycle $W_{4s}$. However, by precisely selecting the pressure and volume at which the exhaust valve is opened at point 4, we can achieve the following relation:

$$0.5*W_{4s}<W_{2s}<W_{4s} \qquad (1)$$

Since the two-stroke cycle according to the present invention executes at twice the speed of the four-stroke cycle as it occurs for every two piston strokes instead of every four strokes, if relation (1) is satisfied, it implies that the overall power generated by the two-stroke cycle ($P_{2s}$) is greater than the power generated by the four-stroke cycle ($P_{4s}$). It is noted that the boosting of the intake pressure is achieved by using a turbocharger that runs on the energy of the gases in the exhaust port. Since, in the two-stroke cycle described, these gases have a higher energy than in typical four-stroke turbocharged engines, the pressure boost is available at lower engine revolutions, and a high proportion of the energy used for pressure boosting is recovered from the combustion products. This effect is taken into account when evaluating the available work $W_{2s}$, from the two-stroke cycle.

Figure 2:
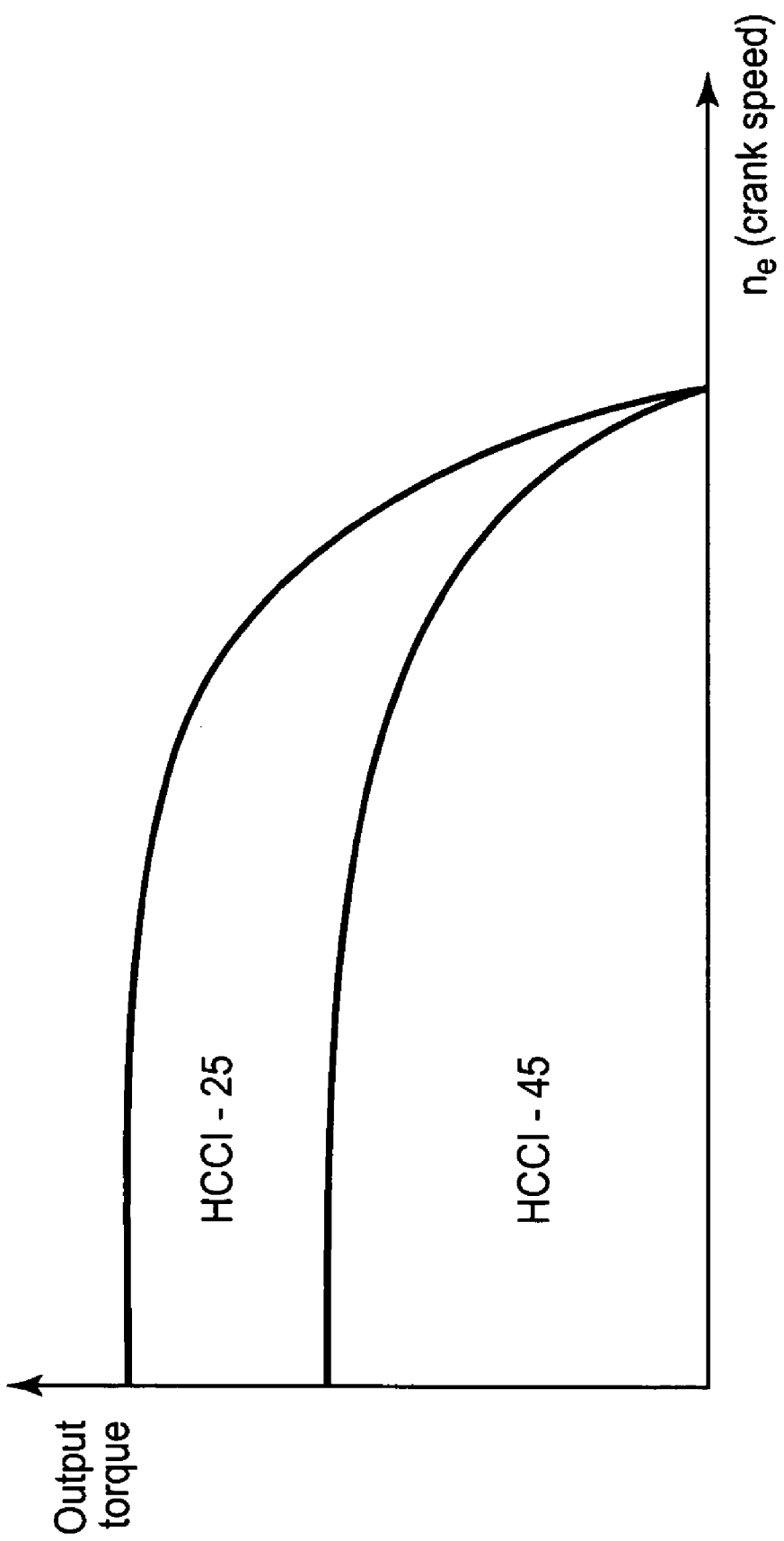
FIG. 2 shows a graph of ranges of operation of the two-stroke and four-stroke cycles in terms of engine output torque versus engine speed.

Due to the availability of pressure boosting at a wider range of engine speeds than in a standard four-stroke cycle, the two-stroke cycle can be applied at lower engine speeds. Thus, according to the present invention, to increase engine power, the engine can be switched from a four-stroke HCCI mode to a two-stroke HCCI mode when such an increase power is called for. In practice, the actual switch between modes can take place during the expansion or exhaust strokes of either mode. FIG. 2 shows a graph of the ranges of operation of the two-stroke and four-stroke cycles in terms of engine output torque versus engine speed. As can be discerned, in the medium to low power regime, the engine runs in the four-stroke HCCI regime. In periods of high load demand, the engine operates in the two-stroke regime to achieve higher power. However, it is noted that the degree to which the two-stroke regime can be extended for higher engine speeds depends to an extent upon the speed and power of the fully variable valve system used to control the opening and closing of the exhaust and intake valves. The graph of FIG. 2 may be digitally represented and stored in non-volatile memory resources situated in the vehicle, and can be used as a data resource or "data map" for indicating which mode the engine should be operating in its current state.

Figure 3:
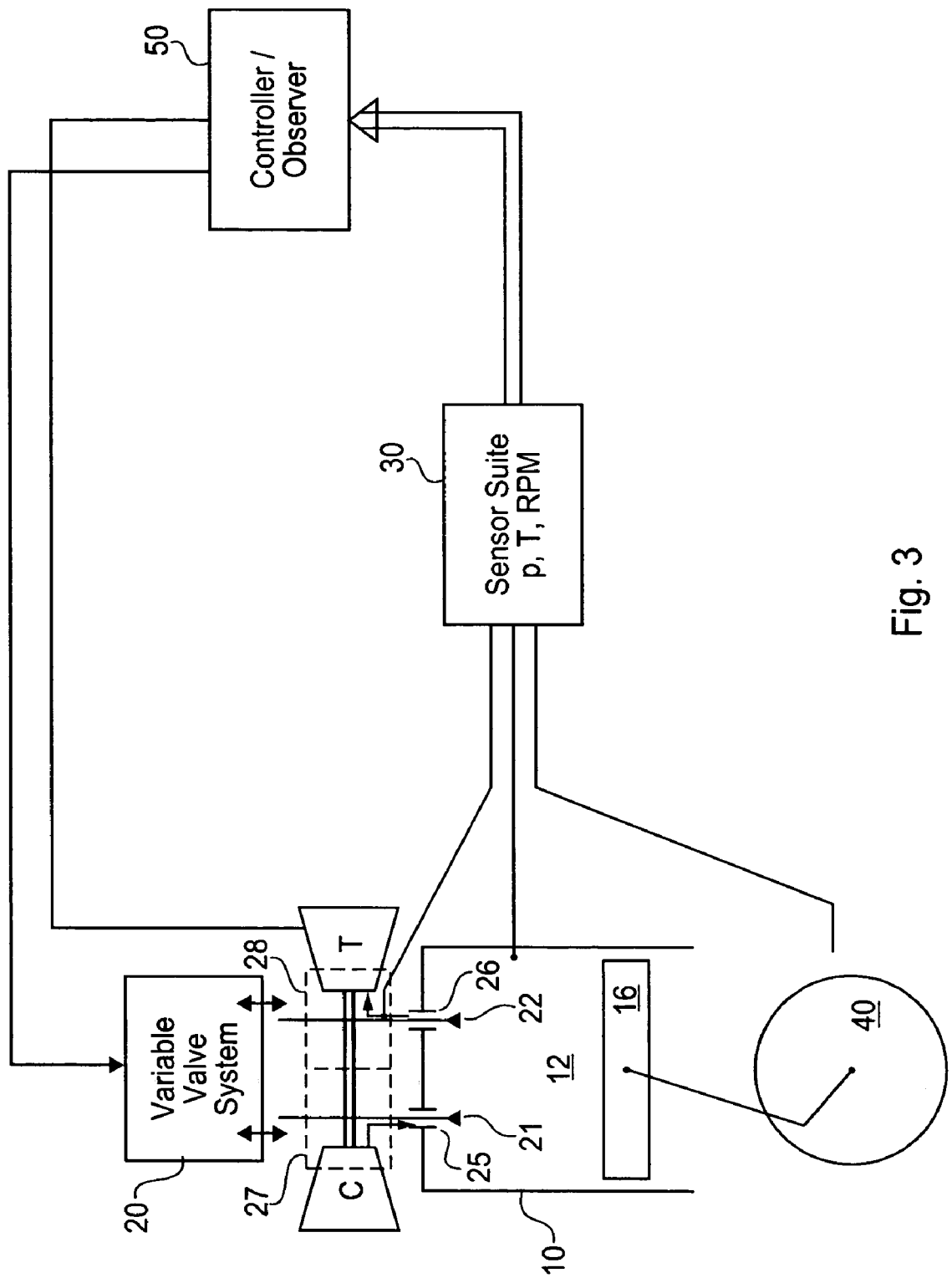
FIG. 3 shows an embodiment of a system for implementing the method according to the present invention.

FIG. 3 shows a schematic diagram of an embodiment of a system that can be used in conjunction with the modified two-stroke HCCI process of the present invention. As shown, an engine cylinder 10 enclosing a charge space 12 and a piston 15 is coupled to a turbocharger comprising a compressor (C) and a turbine (T) via fully variable valves 21, 22 (directly controlled from a variable valve system 20) that open and close intake 25 and exhaust ports 26 of the cylinder respectively. The timing and lift (travel) profiles of the fully variable valves 21, 22 can be varied independently from the position of the piston 15. The turbocharger is coupled to both the intake manifold 27 and the exhaust manifold 28, and provides a pressurized fuel/air charge into the charge space 12 of the cylinder through the intake manifold 27 to an intake port 25 of the cylinder. The turbine (T) of the turbocharger also receives energy for boosting the charge pressure from the heated exhaust gases released from the cylinder into the exhaust manifold 28 via an exhaust port 26.

As discussed, for example, in the article by N. B. Kaahaaina et al. cited above, one type of fully variable valve that can be implemented in this system are electro-hydraulic valves that use a hydraulic power supply and spool valve to translate a piston which bears against a poppet valve. The position of the poppet valve can be adjusted with a high degree of precision by altering the fluid supply to each side of the piston via the spool valve. The spool valve, in turn, may be controlled via a linear motor. Position feedback may be provided by a linear variable differential transformer (LVDT) attached to the actuator piston. It is understood that other fully variable valve configurations and mechanisms may also be implemented in a manner consistent with the requirements of the present invention.

A sensor suite 30 is coupled both to the charge space 12 of the cylinder and to the crankshaft 40 through which it makes measurements of, for example, the pressure and temperature of the gases in the charge space and also the revolutions per minute (RPMs) of the crankshaft. The sensor suite outputs signals representative of these parameters to an electronic controller/observer 50, which may include, for example, a microprocessor or other suitable processing arrangement. The controller/observer 50 monitors the power demand and the current state of engine and controls the switching between two-stroke and four-stroke modes when it determines that a switch between two-stroke and four-stroke modes (or vice versa) would be advantageous to accommodate a demand for high engine load. The state of the engine is partly characterized by pressure and temperature measurements in the cylinder 10, the intake manifold 27, the exhaust manifold 28, and the engine revolution speed. Sensors adapted for detecting other parameters can also be incorporated in the sensor suite 30. Based on the information provided by the sensor suite 30, the torque demand request made by the engine operator via the accelerator pedal, and the data map represented by FIG. 2, the controller executes a preset program, which outputs control inputs to the variable valve system 20 and the turbocharger. In this way, the controller/observer 50 implements the modified two-stroke HCCI method according to the present invention for extending HCCI into high load regimes.

While the method according to the present invention has been primarily presented for the case of engines operating with HCCI combustion, the method is equally applicable to other combustion modes. In particular, this method can be applied to engines operating purely in the spark-ignition mode, as well as engines operating in Diesel mode.

Figure 4:
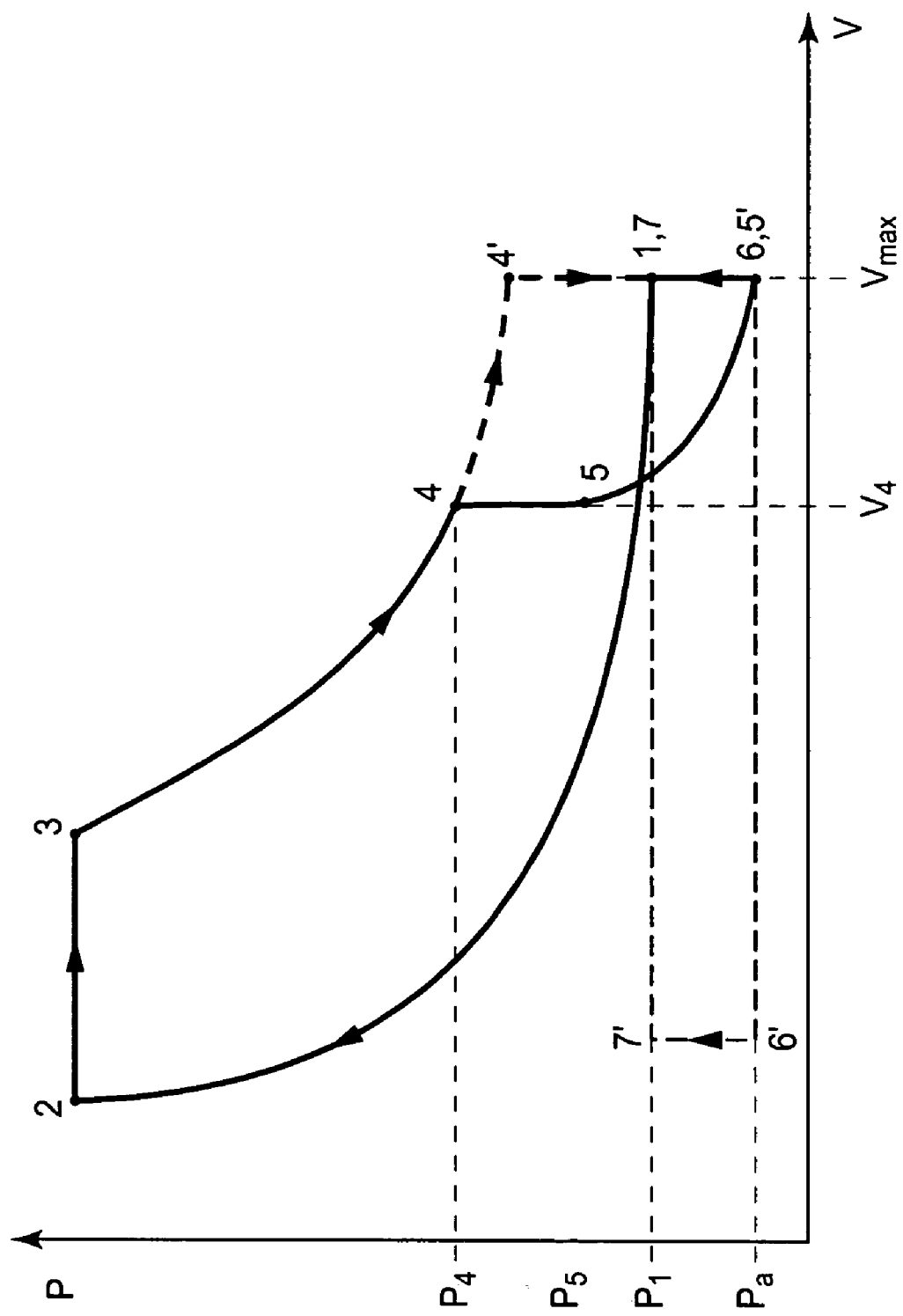
FIG. 4 shows a graph depicting both a turbocharged two-stroke Diesel engine cycle (solid line) according to an embodiment of the present invention and a Diesel four-stroke engine cycle (dotted line) with pressure on the y-axis versus volume on the x-axis.

In particular, the modified two stroke HCCI process can be used in a Diesel cycle as shown in FIG. 4. In contrast to the gasoline (Otto) cycle, the combustion process (between points 2 and 3) in the standard Diesel cycle happens at constant pressure, reflecting the high speed of combustion. However, the two-stroke modification takes place at point 4, and a further intake takes place between 6 and 7 as in the case of the two-stroke cycle for standard gasoline cycle described above and depicted in FIG. 1.

Since the modified two-stroke HCCI process according to the present invention inherently utilizes the oil system of the standard four-stroke engine, the lubrication problem related to purely two-stroke engine cycles is avoided.

In the foregoing description, the invention has been described with reference to a number of examples that are not to be considered limiting. For example, while the present invention is particularly suitable for HCCI engines using gasoline or Diesel fuel, it is not limited to this specific type of fuel. Other fuels, including both liquid and gaseous fuels can be used. Examples of such fuels include liquid or gaseous hydrogen, gaseous hydrocarbon fuels (such as methane, propane), or other hydrocarbon liquid fuels. It is to be understood and expected that variations in the principles of the systems and methods herein disclosed may be made by one skilled in the art and it is intended that such modifications, changes, and/or substitutions are to be included within the scope of the present invention as set forth in the appended claims.

What is claimed is:

1. A method of extending the load range of Homogeneous Charge Compression Ignition in an internal combustion engine including an engine cylinder having a piston, the method comprising:

detecting a current state of the engine;

detecting a load demand placed on the engine;

determining if the load demand is beyond a power generating capacity of a four-stroke engine cycle based solely on the current state of the engine and the load demand; and switching from the four-stroke engine cycle mode to a two-stroke engine cycle mode when it is determined that the load demand is beyond the capacity of the four-stroke engine cycle, by modifying a timing of actuating an intake valve and an exhaust valve independently of the position of a corresponding cylinder piston;

wherein each cylinder in the engine has a single overhead intake valve assembly; and wherein the step of switching from the four-stroke engine cycle mode to a two-stroke engine cycle mode includes:

opening an exhaust valve early during an expansion of the piston through the engine cylinder; and introducing a new charge into the cylinder via the single overhead intake valve assembly coupled to an intake manifold by boosting pressure in the intake manifold to higher than atmospheric pressure.

2. The method of claim 1, wherein the engine has a standard four-stroke design with a valving system capable of executing timing and travel profiles independently with respect to a position of the piston in the cylinder.

3. The method of claim 2, further comprising:

using an electronic controller, determining based on load demand and a current state of the engine, the timing and travel profiles of the fully variable valves to be executed.

4. The method of claim 2, wherein the pressure in the intake manifold is boosted by a turbocharger.

5. The method of claim 1, wherein the exhaust valve and the intake valve are electro-hydraulic valves or electromagnetic valves.

6. A system for implementing a high load two-stroke HCCI engine cycle in an internal combustion engine including a cylinder having a piston that normally operates using a four-stroke HCCI engine cycle, the system comprising:

an electronic controller/observer configured to switch from the four-stroke engine cycle mode to the two-stroke mode in response to a high load demand;

a variable valving system coupled to the electronic controller/observer and responsive to signals transmitted by the electronic controller/observer to actuate intake and exhaust valves of the cylinder in a fully variable manner; and a turbocharger coupled to the cylinder and controlled by the electronic controller/observer operative to provide a pressure-boosted charge to the cylinder, enabling introduction of a charge without movement of the piston;

wherein the cylinder includes a single overhead intake valve assembly; and wherein the switching from the four-stroke engine cycle mode to a two-stroke engine cycle mode includes:
opening an exhaust valve early during an expansion of the piston through the engine cylinder; and
introducing a new charge into the cylinder via the single overhead intake valve assembly coupled to an intake manifold by boosting pressure in the intake manifold to higher than atmospheric pressure.

7. The system of claim 6, wherein the engine has a standard four-stroke design and the variable valving system is capable of executing timing and travel profiles independently with respect to a position of the piston in the cylinder.

8. The system of claim 7, wherein the electronic controller/observer determines, based on load demand and a current state of the engine, the timing and travel profiles of the fully variable valves to be executed.

9. A method of operating an internal combustion engine that normally operates in a four-stroke engine cycle mode, the method comprising:
determining if a load demand placed on the engine is beyond a power generating capacity of the four-stroke-engine cycle mode; and
switching from the four-stroke engine cycle mode to a two-stroke engine cycle mode when it is determined that the load demand is beyond the capacity of the four-stroke engine cycle regardless of engine speed;

wherein the switching between the four-stroke engine cycle mode to a two-stroke engine cycle mode is performed by controlling a timing and a lift of a single overhead intake valve assembly and a single exhaust valve assembly, wherein the switching includes: opening an exhaust valve early during an expansion of the piston through the engine cylinder; and introducing a new charge into the cylinder via the single overhead intake valve assembly coupled to an intake manifold by boosting pressure in the intake manifold to higher than atmospheric pressure.

10. The method of claim 9, wherein engine is operable via at least one of a liquid and gaseous fuel, the fuel being one of hydrocarbon-based and non-hydrocarbon-based.

11. The method of claim 10, wherein the fuel includes at least one of methane and propane.

12. The method of claim 9, wherein the four-stroke engine cycle mode and the two-stroke engine cycle mode are adapted for standard gasoline fuel and Otto cycle.

13. The method of claim 9, wherein the four-stroke engine cycle mode and the two-stroke engine cycle mode are adapted for Diesel fuel and Diesel cycle.

* * * * *